(12) United States Patent  
Karras et al.

(10) Patent No.: US 9,413,471 B2
(45) Date of Patent: Aug. 9, 2016

(54) HIGH PERFORMANCE COMPACT RF RECEIVER FOR SPACE FLIGHT APPLICATIONS

(71) Applicant: LOCKHEED MARTIN CORPORATION, Bethesda, MD (US)

(72) Inventors: Thomas W. Karras, Berwyn, PA (US); Stephen V. Robertson, Harleysville, PA (US); Jeffrey T. Sroga, Deptford, NJ (US); Arthur Paolella, Jamison, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 362 days.

(21) Appl. No.: 14/080,716

(22) Filed: Nov. 14, 2013

(65) Prior Publication Data

US 2015/0132005 A1    May 14, 2015

(51) Int. Cl.
*H04B 10/00* (2013.01)
*H04B 10/90* (2013.01)

(52) U.S. Cl.
CPC .......... *H04B 10/90* (2013.01); *H04B 2210/006* (2013.01)

(58) Field of Classification Search
None
See application file for complete search history.

(56) References Cited

U.S. PATENT DOCUMENTS

| | | | | |
|---|---|---|---|---|
| 7,269,354 B1* | 9/2007 | Silverman | .......... | H04B 10/2575 398/115 |
| 7,460,746 B2* | 12/2008 | Maleki | .......... | G02B 6/122 359/245 |
| 8,121,485 B2* | 2/2012 | Ng | .......... | H04B 10/2575 398/102 |
| 8,135,288 B2* | 3/2012 | Franklin | .......... | H04B 10/505 372/32 |
| 8,452,190 B1* | 5/2013 | Robertson | .......... | H04J 14/0298 398/183 |
| 9,002,207 B1* | 4/2015 | Karras | .......... | H04B 10/22 398/115 |
| 2002/0003641 A1* | 1/2002 | Hall | .......... | H04B 10/532 398/65 |
| 2003/0210854 A1* | 11/2003 | Tu | .......... | G02B 6/3584 385/18 |
| 2005/0069333 A1* | 3/2005 | Moeller | .......... | H04B 10/64 398/202 |

(Continued)

FOREIGN PATENT DOCUMENTS

EP    1184660 A2 *  3/2002  .............. G01J 9/00

OTHER PUBLICATIONS

Nagatsuma et al; Microwave and Their Applications to communications and measurements; 2008, Piers Online, vol. 4. No. pp. 376-380.*

(Continued)

*Primary Examiner* — Daniel Dobson
*Assistant Examiner* — Amritbir Sandhu
(74) *Attorney, Agent, or Firm* — McDermott Will & Emery LLP

(57) ABSTRACT

A compact photonic radio frequency receiver system includes a laser source that is configured to generate laser light Radio frequency (RF) and local oscillator (LO) input ports may receive RF and LO signals, respectively. One or more miniature lithium niobate waveguide phase modulators may be coupled to the laser source to receive the RF and LO signals and to modulate the laser light with the RF and LO signals in a first and a second path, and to generate phase-modulated laser lights including an RF-modulated light signal and an LO-modulated light signal. A first and a second miniature filter may be coupled to the miniature lithium niobate waveguide to separate a desired spectral band in the phase-modulated laser light of the first path and to facilitate wavelength locking of the laser light of the second path. An optical combiner may combine output laser lights of the first and second filters.

27 Claims, 5 Drawing Sheets

(56) References Cited

U.S. PATENT DOCUMENTS

| | | | | |
|---|---|---|---|---|
| 2005/0175358 A1* | 8/2005 | Ilchenko | G02F 1/011 | 398/198 |
| 2006/0202110 A1* | 9/2006 | Karlquist | G01R 23/175 | 250/227.12 |
| 2007/0009205 A1* | 1/2007 | Maleki | G02B 6/122 | 385/27 |
| 2010/0028012 A1* | 2/2010 | Ng | H04B 10/2575 | 398/116 |
| 2010/0046879 A1* | 2/2010 | Lee | G02F 1/2255 | 385/2 |
| 2010/0230621 A1* | 9/2010 | Rideout | G02F 1/01 | 250/551 |
| 2012/0177384 A1* | 7/2012 | Ryf | G02B 6/29373 | 398/202 |
| 2013/0028552 A1* | 1/2013 | DeSalvo | H03H 2/003 | 385/2 |
| 2013/0315590 A1* | 11/2013 | Zhou | H04Q 11/0003 | 398/48 |
| 2014/0266826 A1* | 9/2014 | Valley | H03M 1/12 | 341/137 |
| 2014/0270783 A1* | 9/2014 | Prather | H04B 10/25752 | 398/115 |
| 2015/0104191 A1* | 4/2015 | Hajimiri | H04B 10/50 | 398/183 |
| 2015/0132005 A1* | 5/2015 | Karras | H04B 10/90 | 398/115 |

OTHER PUBLICATIONS

Mani Hossein-Zadeh et a;; Photonic microwave receivers based on high-Q optical resonance; 2012, SPIE vol. 8236; pp. 1-10.*

* cited by examiner

HIGH PERFORMANCE COMPACT RF RECEIVER FOR SPACE FLIGHT APPLICATIONS

STATEMENT REGARDING FEDERALLY SPONSORED RESEARCH OR DEVELOPMENT

Not applicable.

FIELD

The present disclosure generally relates to receivers and more particularly without limitation to high performance compact radio-frequency (RF) receivers for space flight and airborne applications.

BACKGROUND

Space and airborne communications and electronic warfare (EW) systems can benefit from a significant increase in data rates and coverage on the ground, in addition to an increase in the number of antenna apertures and receiver channels. Conventional front end receivers can limit the capacity in each of these areas. The front-end of a receiver for space flight communication applications can take up about 30% of the payload mass of a space communication system. A compact, low mass receiver could reduce that value or increase the capacity of the system. However, while a compact receiver is desirable, creating the compact receiver may be difficult because available components and packaging are too large and may not provide needed functionality.

For example, existing compact solutions based on electro-absorption amplitude modulators (EAMs) may be limited in gain and noise figure (NF) by the inherent gain saturation of the EAMs. Moreover, the EAM-based receivers may suffer from high insertion loss, the need for bias supply that can lead to approximately 3 dB loss, and limited optical power handling capacity (e.g., 500 mWatts). Among other limitations of the existing EAM-based compact receiver are the large number of harmonics generated, limits on the spur-free-dynamic range (SFDR) due to saturation effects, and difficulties in developments at very high frequencies (e.g., 100 GHz).

SUMMARY

According to one or more aspects of the present disclosure, a compact photonic radio frequency (RF) receiver system is provided. The system includes a laser source that is configured to generate laser light. RF and local oscillator (LO) input ports may receive RF and LO signals, respectively. One or more miniature lithium niobate or equivalent waveguide phase modulators may be coupled to the laser source to receive the RF and LO signals and to modulate the laser light with the RF and LO signals in a first and a second path, and to generate phase-modulated laser lights including an RF-modulated signal and an LO-modulated signal. A first and a second miniature filters may be coupled to the miniature lithium niobate waveguide, the first miniature filter may separate a desired spectral band in the phase-modulated laser light of the first path and a second miniature filter may facilitate wavelength locking of the laser light of the second path and provide a second source for heterodyne IF signal recovery. An optical combiner may combine output laser lights of the first and second filters for heterodyne mixing in a balanced detector that follows.

In some aspects, a method of using photonics in a space borne or airborne radio frequency (RF) communication system includes using one or more miniature lithium niobate or equivalent waveguide modulators to phase-modulate an RF signal including data component received from an uplink source to an optical carrier to generate an RF-modulated light signal. The one or more miniature lithium niobate waveguide modulators may be used to phase-modulate a local oscillator (LO) signal to the optical carrier to generate an LO-modulated light signal. The RF-modulated and the LO-modulated light signals may be filtered by using millimeter scale optical filters to reject the carrier and isolate desired bands of the RF signal. The filtered RF-modulated light signal and the filtered LO-modulated light signals may be mixed to recover an IF downlink frequency component and to generate a downlink signal including the data component.

According to a further aspect of the present disclosure, a compact photonic radio frequency receiver system for space flight applications includes a laser source chip that is configured to generate a carrier laser light. One or more miniature lithium niobate, or equivalent, waveguide phase modulators may be coupled to the laser source and configured to modulate the carrier laser light with an RF and a local oscillator (LO) signal and to generate phase-modulated laser lights. Miniature optical filters may be coupled to the one or more miniature lithium niobate waveguide modulators and configured to separate a desired spectral band in the phase-modulated laser light and to facilitate wavelength locking of the carrier laser light, the miniature filters may comprise an optical RF multi-pole filter. A miniature optical switch array may be coupled to the miniature optical filters and configured to multiple channels of the modulated and filtered laser light. A miniature detector may be coupled to the optical switch array and configured to recover, through a heterodyne process, a radio frequency output of a desired downlink frequency component.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
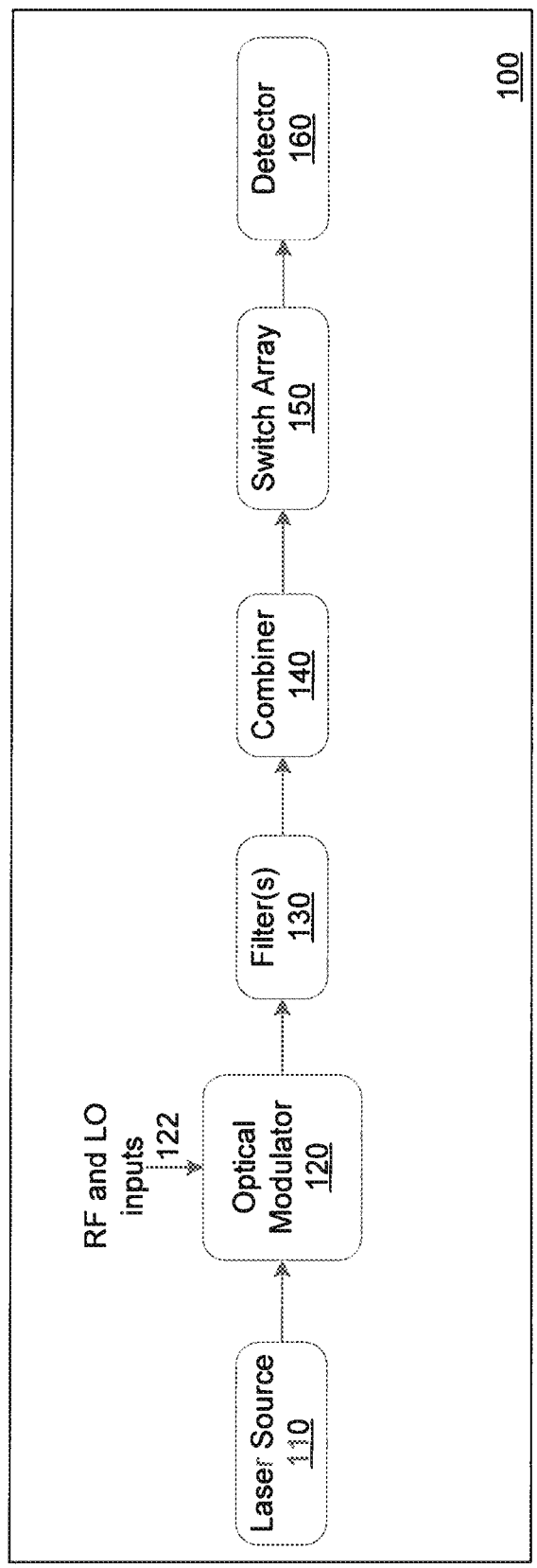
FIG. 1 is a high-level serial block diagram illustrating an example of a compact photonic radio frequency (RF) front-end receiver system according to some aspects of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

According to various aspects of the subject technology, a compact receiver is achieved using miniature (e.g., millimeter scale) photonic components coupled with micro-optic and chip-and-wire technology. The compact receiver reduces the payload mass required for a communication system. A reduction of the payload mass, an associated reduction in size and component cost, and an increase in radio-frequency (RF) carrier bandwidth can enable next-generation military and commercial communication satellites to cover a larger ground footprint with higher data rates and a larger number of beams at lower cost, for example, by paralleling several such compact receivers together. Broadband capability can also allow the compact receiver to handle multiple bands simultaneously.

For communication systems, uplinks and downlinks to and from the ground, air, or other space platforms use RF or millimeter-wave (mm-wave) carriers because of limitations imposed by atmospheric and cloud transmission. According to aspects of the disclosure, some functions of a communication system (e.g., the front-end following the antennas of the spacecraft and before high power amplification) performed on a spacecraft or other mass-sensitive platform are implemented with optical carriers. The functions generally performed in a photonic RF communications system according to aspects of the subject technology include (1) modulation of RF signals to an optical carrier, (2) filtering of the down link signal stream into channels needed for the downlink, (3) switching and combing the filtered sub-streams into new data streams, and (4) frequency translation of the frequency of the uplink data stream to a downlink frequency and converting the frequency-translated data stream into the electrical domain for amplification and transmission to the ground or elsewhere.

Package size and weight can dominate the size and weight of the front-end of a communication or electronic warfare system. Aspects of the subject technology provide a compact receiver that can reduce the package size or weight, for example by a factor of ten or more. In some aspects, the compact receiver has dimensions on a 1" or 2" scale, although larger receivers can be used. Thus, components of the compact receiver must be of centimeter scale or smaller, meet the functional needs of the system, and be suitable for space and airborne applications.

Modulators based upon commonly available lithium niobate Mach Zehnder Interferometers (MZI) avoid saturation, optical power and BW limitation and insertion losses but are not the cm scale or less needed for compact packaging. However, compact lithium niobate phase modulators are now becoming available with all these improvements as well as avoiding the bias requirement and providing improved performance. These modulators can be incorporated into a series architecture in which both RF and LO modulators are placed in series with the filter in a single branch or into a parallel or two branch architecture in which the RF modulator and its filter are placed in one branch and the LO and its filter in another. The latter is expected to provide better gain and noise figure performance. All of these components must be cm scale or less so that they can be fit into an inch scale package with temperature control (e.g. thermo-electric coolers) and either hybrid or heterogeneous integration.

For example, the subject technology can use small phase modulators based upon the electro-optic effects such as small lithium niobate (LiNbO3) waveguide devices. Such devices allow receivers to overcome performance limitations of electro-absorption amplitude modulator (EAM)-based receivers or Mach Zehnder Interferometer (MZI) based receivers. The subject devices have no gain saturation effects, can provide significantly lower insertion loss, do not require bias current (or voltage), and, can operate at optical power levels above 2 watts. The disclosed device can eliminate most harmonics and that remaining harmonics can be easily filtered. Consequently, gain and noise figure of the subject device can be improved by over 10 dB. Furthermore, the dynamic range of the disclosed devices are inherently linear and can operate at frequency ranges above 125 GHz. Equally important, the availability of small (e.g., of 2 cm scale or smaller) lithium niobate phase modulators makes compact packaging practical with most of the above properties (e.g., phase modulation beyond 100 GHz, watt-level optical power capacity, and more). The subject technology thus allows an overall performance, size and weight to be much better than that obtainable with EAM-based and MZI based devices.

FIG. 1 is a high-level serial block diagram illustrating an example of a compact photonic radio frequency (RF) front-end receiver system 100 according to some aspects of the disclosure. The photonic RF front-end receiver system (hereinafter "receiver system") 100 can exhibit some or all of the characteristics outlined above. Receiver system 100 includes a laser source 110, a dual optical modulator 120, Filters (e.g., optical RF multi-pole filters) 130, combiner 140, optical switch array 150, and detector 160.

The laser source 110 can generate an optical carrier in the form of laser light and may be capable of operating in power level range (e.g., 2 Watts or more) sufficient to meet system gain and noise figure requirements. The laser source also has sufficient electrical efficiency such that laser temperature control power requirement, which may dominate system electrical power requirements, is compatible with the current system power requirements. For example, laser sources with electrical efficiencies greater than 15% can be used. Laser sources with higher electrical efficiencies such as 25% to 50%, or even higher, can be used to improve electrical power requirements.

In some aspects, laser source 110 has a wavelength of about 1550 nanometers to be compatible with telecom component characteristics (thus drawing off of that large technology base). The wavelength of the laser source 110 may be controllable, so that the laser source 110 is compatible with wavelength locking to a filter. The laser source 110 may have a line-width narrow enough to be compatible with MHz-class channelization, and/or relative-intensity noise (RIN) that is sufficiently low so as to not dominate the system noise. For example, a semiconductor distributed-feedback (DFB) laser that can satisfy the foregoing requirements may be used for the laser source 110. Other laser sources with other characteristics also can be used if they are sufficiently small.

The optical modulator 120 can modulate the signals from an RF and local oscillator (LO) inputs 122 on the optical carrier with a bandwidth of at least 100 GHz, for example, to be compatible with projected data rate needs. More limited bandwidth capability (e.g., 5-30 GHz) may be adequate for some applications. Optical power handling capacity for the optical modulator 120 may be compatible with that of the laser source 110. The optical modulator 120 is capable of modulating LO and uplink RF signals on an optical carrier with a bandwidth required for frequency translation from uplink frequencies (e.g., 20 GHz) to downlink frequencies (e.g., 1 GHz).

One example of the optical modulator 120 includes a miniature (e.g., centimeter scale) lithium niobate waveguide phase modulator. The lithium niobate waveguide phase modulator has a number of advantages over the EAMs and MZI based devices including improved gain and noise figure as described above. To do this, the lithium niobate waveguide phase modulator should have low Vpi (e.g., a voltage required to change the phase by 180 degrees), low optical loss, handle high optical power (>1-2 watts), support high bandwidth (>100 GHz) and fit into small packages. Other similar types of optical modulators can be used, for example, miniature lithium niobate or indium phosphide Mach Zehnder Interferometer (MZI) based modulators (MZMs) but without the full performance capability The filter 130 may include one or more optical RF multipole (e.g., 1-5-pole) filters with pass-bands that meet communication system requirements (e.g., 1 MHz to 1 GHz 3-dB channel width, less than 0.5 dB ripple, and 70 dB out-of-band rejection). The band-pass filters (BPFs) may include sharp-edge filters such as Chebyshev and elliptic filters. The filters may also facilitate wavelength locking of the laser source. Optical power handling and insertion loss should not limit RF signal recovery at the system output. For example, a filter that can handle an optical power of 10-100 mWatt with less than 1 dB of loss in the pass-band can be used. Alternatively, in some aspects, higher losses such as 2 to 7 dB can be acceptable According to some aspects of the subject technology, centimeter scale filters should satisfy the foregoing requirements and could provide center frequency and channel width tuning. Filters that are based on a monolithic assembly of several very high-Q and free-standing whispering-gallery mode (WGM) resonators are suitable for pass-bands of 1-100 MHz. Fabry-Pérot filters or fiber Bragg grating filters may be suitable for pass-bands above 100 MHz. The specific filter design, particularly the number of poles used, is dependent upon the pass-band requirements. The subject technology is not limited to use of these filters within these example frequency ranges. As various filter technologies mature, these and other filters can be used for various pass-bands.

As the optical modulator 120 and the filter (s) 130 may process the optical carrier at two separate light paths, the combiner 140 may be used to combine the modulated and filtered light outputs of the two paths.

The switch array 150 includes one or more optical switch arrays that are compatible with redundancy, combining operations, and port counts needed in communications applications (e.g., 4×4 to 16×16). Optical power handling and insertion loss of the switch array 150 should not limit RF signal recovery at the system output (e.g. 10 mw and less than 1 dB loss). In some aspects, optical switch array 150 are based on silicon waveguide-based thermo-optic, electro-optic MZIs, or photonic crystal technologies.

Optical signal distribution losses after the switch array 150 and before conversion at the detector 160 may be less than 1 dB at the highest RF frequencies (e.g., 100 GHz). The switch array 150 may be mechanically small and flexible for easy harness routing. Signal distribution can take place through optical fibers, which can satisfy these loss and routing requirements.

In some aspects, one or more detectors 160 for heterodyne processing and RF signal recovery are capable of handling the frequency-translated signal (e.g., at 1 GHz) with high responsivity (e.g., about 1 mA/mWatt). Commercial detectors that can meet the bandwidth requirements of the frequency-translated signal can be used.

According to certain aspects, the components of a compact photonic RF front-end receiver system 100 can be packaged with millimeter scale micro-optics and microelectronic elements in a sealed package. Millimeter to centimeter scale micro-optical elements compatible with 1" to 3" scale packaging can be used for optical coupling between the components of the compact receiver. Alternatively, some of the components can be built into a heterogeneously integrated chip limiting the number of micro-optical coupling elements that are needed.

Figure 2:
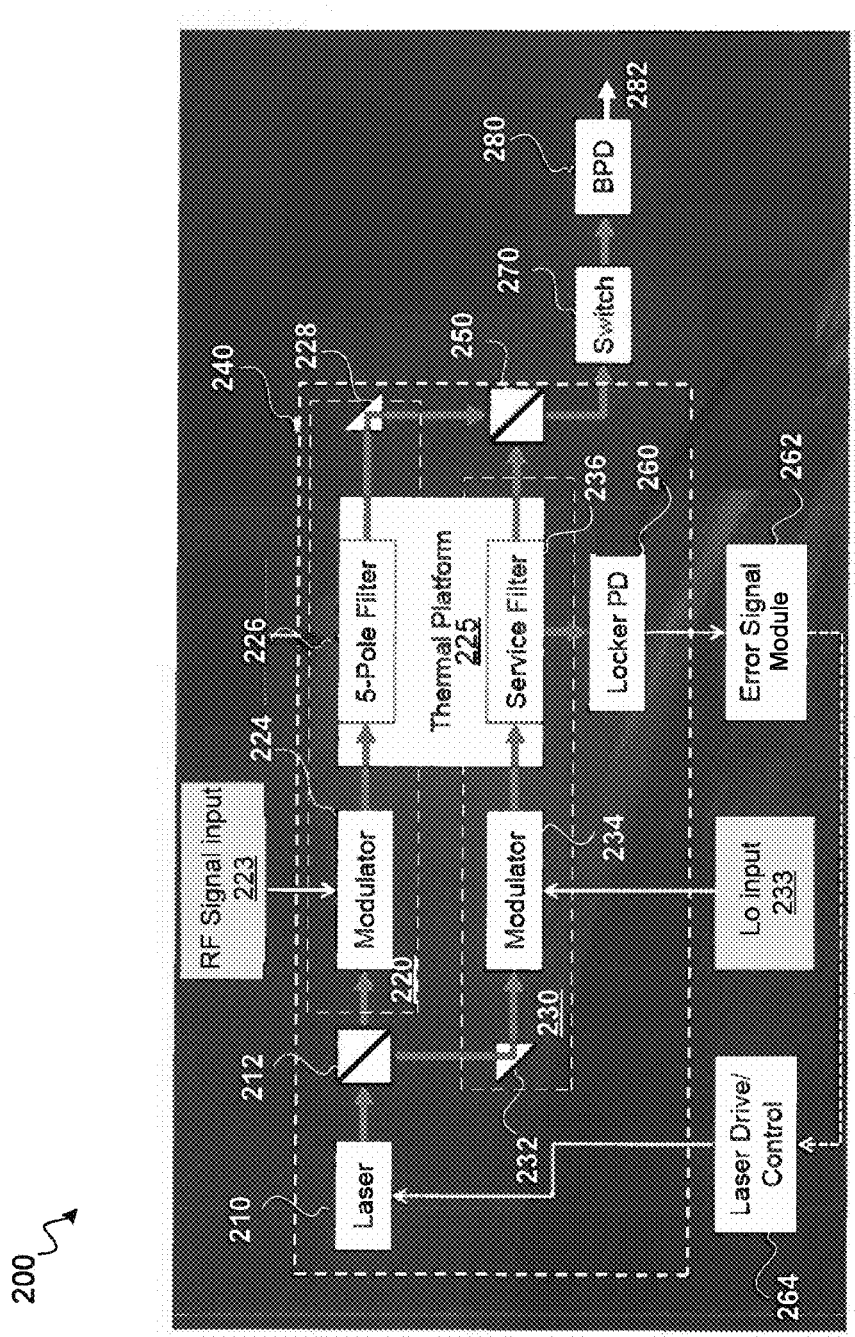
FIG. 2 illustrates an example of a parallel two branch compact photonic RF front-end receiver according to some aspects of the disclosure.

FIG. 2 illustrates an example of a parallel two-branch compact photonic RF front-end receiver 200 according to some aspects of the disclosure. The photonic RF front-end receiver 200 (herein after "receiver 200") includes a laser source 210, an optical beam splitter 212 that splits and directs the laser light of the laser source 210 into a first path 220 and a second path 230, an optical combiner 250 that combines the output lights of the first and second paths 220 and 230, a switch array 270, and a balanced-photo detector (BPD) 280. The first path 220 includes a first optical modulator 224, a multi-pole filter 226, and a turning mirror 228. The second path 230 includes a turning mirror 232, a second optical modulator 234, and a second filter (e.g., a service filter) 236. The multi-pole filter 226 and the second filter 236 are mounted on a thermal platform 225. The thermal platform can also have mounted upon it all elements of the package, including in particular the laser, to control their temperature. A wavelength locker photo-detector 260 can provide an optical signal to an error signal module 262 that converts the optical signal to an electrical error signal that can be used by a laser driver/control module 264 to control the laser source 210. The laser driver/control module 264 can use the error signal to stabilize the wavelength of the laser source 210 to fit the filter pass-band.

In one or more aspects, the functionalities of the first and second modulators 224 and 234 can be performed by a single miniature lithium niobate waveguide modulator. In some aspects, the first and second modulators can be two different miniature lithium niobate waveguide modulators. Each miniature lithium niobate waveguide modulator is a high-gain (e.g., over 10 dB) and low-loss phase modulator with watt level optical power handling, is smaller than two cm, and is operable at frequencies up to and beyond 100 GHz. The entire receiver 200 except for some or all of the switch array 270, the BPD 280, the error signal module 262, and laser driver/control module 264 can be integrated on a single package 240. The optical signals between some of the components of the receiver 200 may be transported through waveguides or through millimeter scale free space micro-optics.

RF signal (e.g., with a carrier frequency of 20 GHz and having a signal bandwidth of approximately 500 MHz) can enter receiver 200 through RF input port 223 and a local oscillator (LO) signal (e.g., at a frequency of 19 GHz) is input through LO input port 233. The RF signal includes a modulated RF signal carrying data received from an uplink source. Laser light from the laser source 210, for example, a DFB laser, is also steered to the first and second modulators 224 and 234 through the beam splitter 212. The RF and LO signals are fed to the first and second modulators 224 and 234 and are used to phase modulate the laser light, which serves as an optical carrier. The output signals from the modulators 224 and 234, after filtering, can be combined to produce a frequency translated downlink signal 282 (e.g., at 1 GHz) in the BPD 280.

The multi-pole filter 226 may include one or more optical RF multi-pole (e.g., 5-pole) BPFs that can pass a desired band of the RF modulated optical carrier with a small (e.g., less than 0.5 dB) ripple. The BPFs may include sharp-edge filters such as Chebyshev and elliptic filters. The second filter 236 can perform two functions. First, it can function as a PBF for the LO modulated light and passes the LO modulated light of a desired band (e.g., one or more frequency shifted sidebands) to the combiner 250. Second, the second filter 236 may reflect the LO modulated light (e.g., a carrier or the side-band) to the locker PD 260 to be used for wavelength locking of the laser source. The wavelength locking mechanism may include converting, by the locker PD 260, the reflected light from the second filter 236 into an electrical signal that is delivered to the error signal module 262. The error signal module 262 may generate the proper error signal that is used by the laser drive/control module 264 to control the wavelength of the laser source 210 and prevent drift in the wavelength of the laser source 210 due factors such as aging and/or temperature variations.

The light from the filter assembly (e.g., the first and the second filters 226 and 236) are combined by combiner 250 and are steered to the switch array 270. The combined light may exit the package 240 through a focusing lens (not shown for simplicity), which focuses the light onto a fiber that carries the light to the optical switch array 270 and ultimately to BPD 280 that processes the light to perform the heterodyne detection recovery of the selected portion of the downlink spectral band. The package 240 may further include a number of isolators, lenses, splitters, combiners, and mirrors that are not shown in FIG. 2 for simplicity. In some aspects, the optical elements are free space micro-optics. In one or more aspects, free space micro-optics, high contrast gratings, or polymer based self-forming waveguides or heterogeneous coupling may be used to transport optical signals between at least some of the laser source 210, the miniature lithium niobate waveguide modulators 224 and 234, the optical RF filters 226 and 236, the optical switch array 270, and the detector 280.

Figure 3:
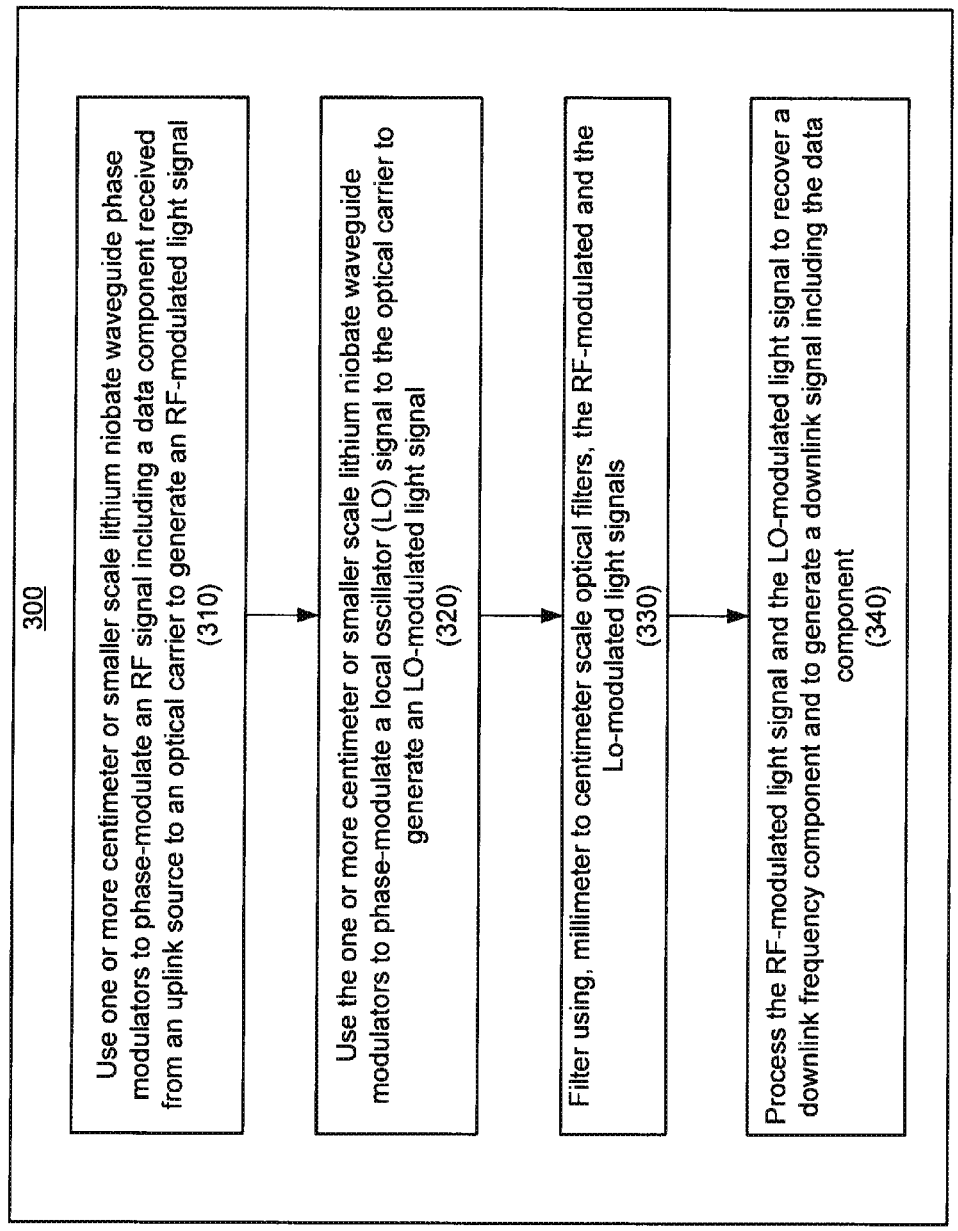
FIG. 3 is a flow diagram illustrating an example of a method of using photonics in a space borne or airborne radio frequency (RF) communication system according to some aspects of the disclosure.

FIG. 3 is a flow diagram illustrating an example of a method 300 of using photonics in a space borne or airborne radio frequency (RF) communication system according to some aspects of the disclosure. The steps of the method 300 do not need to be performed in the order shown and one or more steps may be omitted. At operation block 310, one or more miniature lithium niobate waveguide modulators (e.g., 120 of FIG. 1 or 224 of FIG. 2) may be used to phase-modulate an RF signal (e.g., received at 223 of FIG. 2) including a data component received from an uplink source to an optical carrier (e.g., generated by 210 of FIG. 2) to generate an RF-modulated light signal. At operation block 320, the one or more miniature lithium niobate waveguide modulators (e.g., 234 of FIG. 2) may be used to phase-modulate a local oscillator (LO) signal (e.g., received at 233 of FIG. 2) to the optical carrier to generate an LO-modulated light signal. The RF-modulated and the LO-modulated light signal may be filtered by using millimeter-centimeter scale optical filters (e.g., 226 and 236 of FIG. 2) (operation block 330). At operation block 340, the RF-modulated signal light and the LO-modulated signal light may be processed (e.g., by 280 of FIG. 2) to recover a downlink frequency component and generating a downlink signal including the data component.

Figure 4:
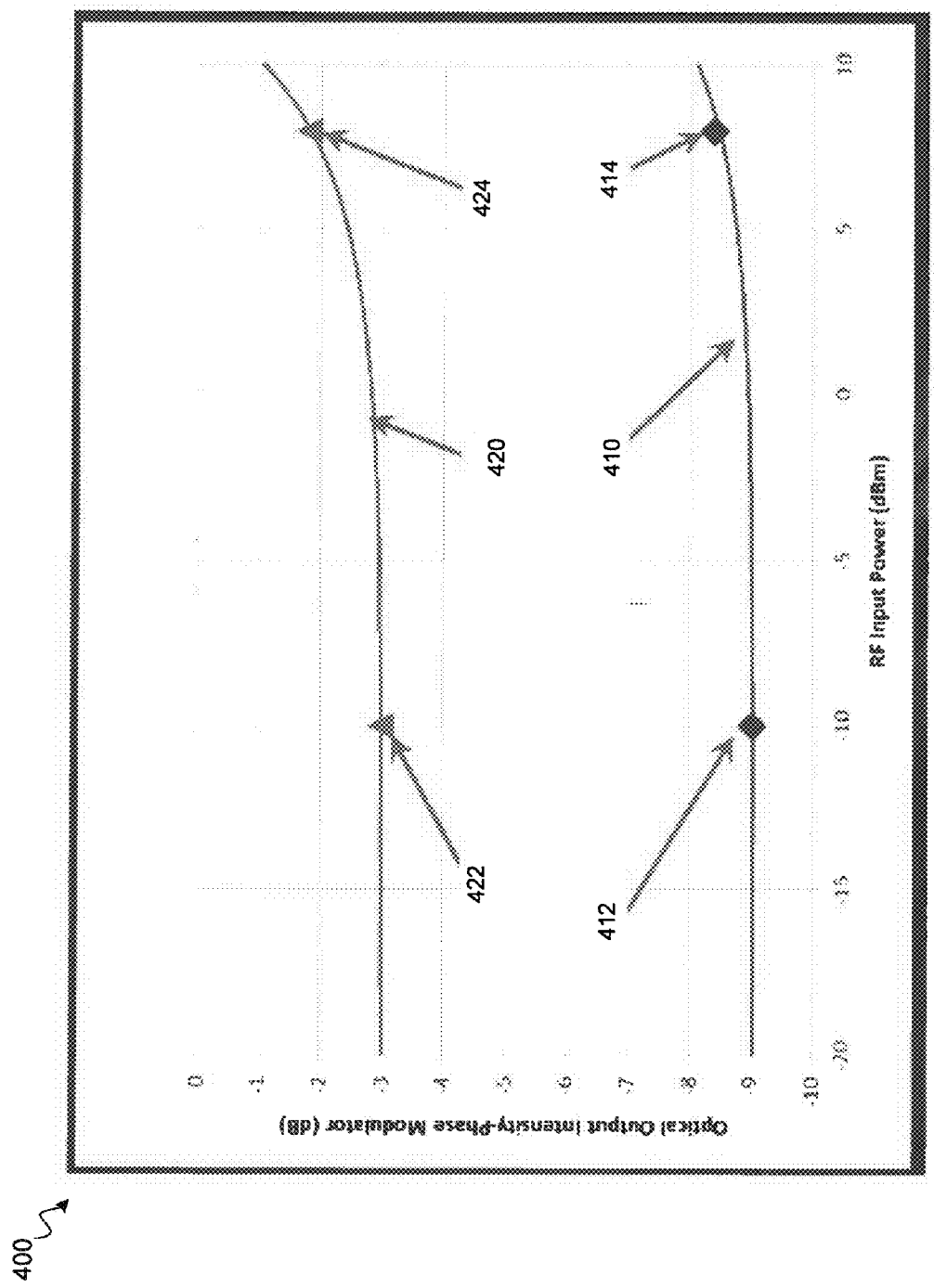
FIG. 4 illustrates examples of simulation and theoretical results according to some aspects of the disclosure.

FIG. 4 illustrates examples of simulation and theoretical results 400 according to some aspects of the disclosure. The simulation and theoretical results 400 include formula-based theoretical result curves 410 and 420 for optical output of intensity/phase modulator for the optical carrier and the RF component, respectively. The simulation result data points 412, 414, 422, and 424 for optical output of intensity/phase modulator for RF input levels and RF-LO levels are seen to match the theoretical results, theretofore, verifying the validity of the simulation results. The phase modulator may be a miniature lithium niobate waveguide modulator and the intensity modulator may be miniature lithium niobate MZI modulator.

Figure 5:
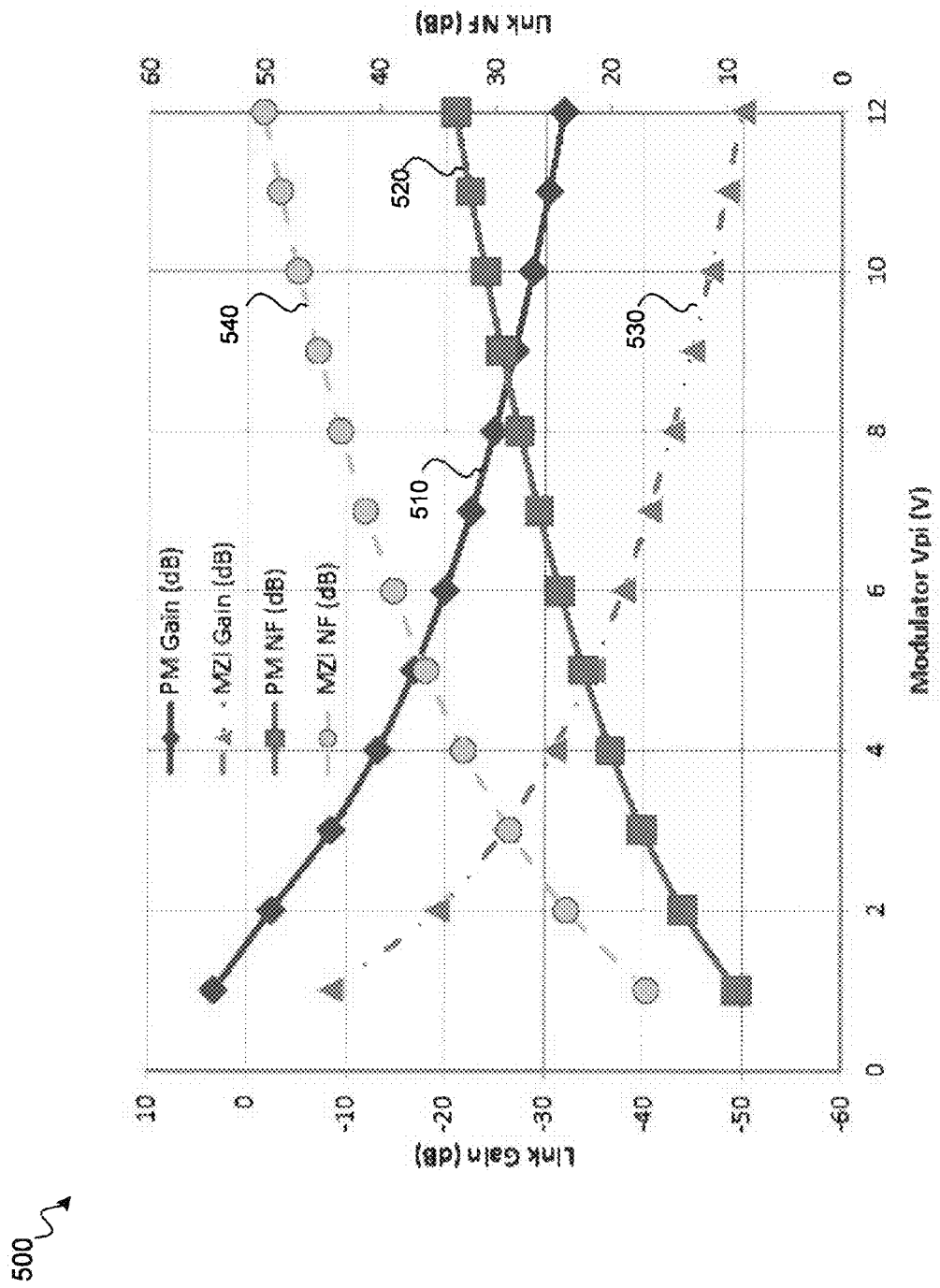
FIG. 5 illustrates example variations of gain and noise figure (NF) versus modulator Vpi for a phase modulator (PM) or a Mach-Zehnder Interferometer (MZI) based parallel two branch architecture according to some aspects of the disclosure.

FIG. 5 illustrates example variation of gain and noise figure (NF) plots 500 versus modulator Vpi for a phase modulator (PM) or a Mach-Zehnder Interferometer (MZI) based parallel two branch architecture according to some aspects of the disclosure. The plots 500 include a plot 510 of gain and a plot 520 of NF corresponding to use of a phase modulator (e.g., a miniature lithium niobate waveguide phase modulator) and a plot 530 of gain and a plot 540 of NF corresponding to use of an intensity modulator (e.g., a miniature lithium niobate MZI modulator). The results show that using the phase modulator can produce higher gain and lower NF values than using an intensity modulator.

The subject technology (e.g., system shown in FIG. 2) includes hybrid integration of free space micro-optics or gratings with photonic components. This hybrid integration permits relatively lower cost and more rapid modification and customization of a photonic RF front-end receiver 200 for particular applications as compared to fabricating new chips that fully integrate the optical and electronic components (e.g., heterogeneous integration). When large quantities of fully integrated elements are needed, however, a heterogeneous integration approach might be the best approach. As one possible result, some aspects of the subject technology can be used in various diverse markets. For example, these markets can include data transmission and communications markets, optical components markets, and photonics and optical computing markets. The subject technology is not limited to these markets.

As used in this disclosure, a phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Likewise, while operations are disclosed in a particular order, this should not be understood as requiring that such operations be performed in the particular order or in sequential order, or that all disclosed operations be performed, to achieve desirable results. Moreover, the separation of various system components in the aspects described above should not be understood as requiring such separation in all aspects.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A compact photonic radio frequency receiver system for space and airborne applications, the system comprising:
   a laser source configured to generate laser light;
   radio frequency (RF) and local oscillator (LO) input ports configured to receive RF and LO signals, respectively;
   one or more centimeter scale or smaller waveguide phase modulators coupled to the laser source and configured to receive the RF and LO signals and to modulate the laser light with the RF and LO signals in a first and a second path and to generate phase-modulated laser lights including an RF-modulated light signal and an LO-modulated light signal;
   a first and a second centimeter scale or smaller filters coupled to the centimeter scale or smaller waveguide phase modulators, the first centimeter scale or smaller filter configured to separate a desired spectral band in the phase-modulated laser light of the first path and the second centimeter scale or smaller filter configured to pass a first portion of the LO-modulated light signal for heterodyne purposes and to reflect a second portion of the LO modulated signal to facilitate wavelength locking of the laser light of the second path; and
   an optical combiner configured to combine output laser lights of the first and second filters.

2. The system of claim 1, further comprising a millimeter scale optical switch array coupled to the optical combiner and configured to switch multiple channels of the modulated and filtered laser lights from one or more receivers to one or more destinations including one or more detectors.

3. The system of claim 2, further comprising a millimeter scale balanced detector coupled to the optical switch array and configured to perform a heterodyne process by down converting the RF-modulated and filtered light signal using the LO-modulated and filtered light signal and to recover a radio frequency output with a desired downlink frequency component.

4. The system of claim 1, wherein the laser source comprises a millimeter scale semiconductor distributed feedback laser, and wherein the phased-modulated laser lights comprise an uplink frequency component, a data component, and an LO component.

5. The system of claim 1, wherein the first centimeter scale or smaller filter comprises a millimeter scale optical RF multi-pole filter and is configured to separate a desired spectral band in the phase-modulated laser light of the first path by filtering a desired downlink frequency component from all other components of the phase-modulated laser lights.

6. The system of claim 5, wherein the optical RF multi-pole filter comprises a monolithic assembly of millimeter scale multiple free standing whispering gallery mode resonators.

7. The system of claim 5, wherein the optical RF multi-pole filter comprises an assembly of photo-lithographically formed resonators on a single chip or multiple chips.

8. The system of claim 5, wherein the optical RF multi-pole filter comprises one of an assembly of Fabry-Pérot filters or a fiber Bragg grating filter configured so as to fit in a volume of 1 cm scale.

9. The system of claim 1, wherein the second centimeter scale or smaller filter comprises a millimeter to centimeter scale optical LO filter and is configured to separate a desired spectral band in the phase-modulated laser light of the second path by filtering a desired wavelength component from other components of the phase-modulated laser light, wherein the optical LO filter comprises one of a single-pole or notch filter, and wherein the desired wavelength component comprises at least one of a primary carrier wavelength or a corresponding LO side-band.

10. The system of claim 9, wherein the optical LO filter comprises a monolithic assembly of millimeter scale free standing whispering gallery mode resonators.

11. The system of claim 9, wherein the optical LO filter comprises one of an assembly of photo-lithographically formed resonators on a single chip or multiple chips, an assembly of Fabry-Pérot filters, or a fiber Bragg grating filter configured to fit in a volume of 1 cm scale.

12. The system of claim 1, wherein each of the centimeter scale or smaller waveguide phase modulators comprises a lithium niobate waveguide phase modulator.

13. The system of claim 1, wherein the optical switch array comprises one of silicon waveguide-based or lithium niobate Mach Zehnder Interferometers or silicon based photonic crystals.

14. The system of claim 1, wherein each centimeter scale or smaller waveguide phase modulator comprises smaller than two cm lithium niobate waveguide phase modulators and is operable at frequencies up to and beyond 100 GHz.

15. The system of claim 14, wherein each centimeter or smaller scale waveguide phase modulator is formed with silicon, indium phosphide or other semiconductor waveguides and is operable at frequencies up to and beyond 100 GHz.

16. The system of claim 15, wherein each centimeter scale or smaller waveguide phase modulator is operable at frequencies up to and beyond 100 GHz.

17. The system of claim 15, wherein the centimeter or smaller scale waveguide phase modulator comprises a low loss modulator with a watt level or greater optical power handling capability.

18. The system of claim 1, further comprising free space micro-optics configured to transport optical signals between at least some of the laser source, the centimeter or smaller scale waveguide phase modulator, an optical RF multi-pole filter, an optical switch array, and a detector, and wherein the free space micro-optics further comprise millimeter scale optics.

19. The system of claim 1, further comprising high contrast gratings configured to transport optical signals between at least some of the laser source, the centimeter or smaller scale waveguide phase modulator, an optical RF multi-pole filter, an optical switch array, and a detector.

20. The system of claim 1, further comprising polymer based self-forming waveguides configured to transport optical signals between at least two of the laser source, the centimeter or smaller scale waveguide phase modulator, an optical RF multi-pole filter, an optical switch array, and a detector.

21. The system of claim 1, further comprising fiber-based waveguides configured to transport optical signals between at least two of the laser source, the cm or smaller scale waveguide phase modulator, an optical RF multi-pole filter, an optical switch array, and a detector.

22. A method of using photonics in a space borne or airborne radio frequency (RF) communication or electronic warfare (EW) system, comprising:
    using one or more centimeter or smaller scale lithium niobate waveguide phase modulators to phase-modulate an RF signal including a data component received from an uplink source to an optical carrier to generate an RF-modulated light signal;
    using the one centimeter or smaller scale lithium niobate waveguide modulators to phase-modulate a local oscillator (LO) signal to the optical carrier to generate an LO-modulated light signal;
    filtering using, millimeter to centimeter scale optical filters, the RF-modulated and the LO-modulated light signals; and
    processing the RF-modulated light signal and the LO-modulated light signal to recover a downlink frequency component and generating a downlink signal including the data component.

23. The method of claim 22, further comprising combining and switching filtered RF-modulated and the LO-modulated light signal.

24. The method of claim 22, further comprising using free space micro-optics to transport the optical carrier between at least some modules of a plurality of modules including the one or more lithium niobate waveguide phase modulators and modules that perform the steps of filtering and processing, and wherein the free space micro-optics comprise millimeter scale optics.

25. The method of claim 22, further using high contrast gratings to transport the optical carrier between at least two modules of a plurality of modules including the lithium niobate waveguide phase modulator and modules that perform the steps of, filtering, and processing.

26. The method of claim 22, further comprising using optical fibers to transport the optical carrier between at least two modules of a plurality of modules including the lithium niobate waveguide phase modulator and modules that perform the steps of filtering, and processing.

27. A compact photonic radio frequency receiver system for space flight applications, the system comprising:
    a laser source chip configured to generate a carrier laser light;
    one or more miniature lithium niobate waveguide phase modulators coupled to the laser source and configured to modulate the carrier laser light with an RF and a local oscillator (LO) signal and to generate phase-modulated laser lights;
    miniature optical filters coupled to the one or more miniature lithium niobate waveguides and configured to separate a desired spectral band in the phase-modulated laser lights and to facilitate wavelength locking of the carrier laser light, the miniature filters comprising an optical RF multi-pole filter;
    a miniature optical switch array coupled to the miniature optical filters and configured to switch multiple channels of modulated and filtered laser lights; and
    a miniature detector coupled to the optical switch array and configured to perform a heterodyne process by mixing the RF-modulated light signal and the LO-modulated light signal and to recover a radio frequency output of a desired downlink frequency component.

* * * * *